United States Patent [19]

Shimizu

[11] 4,105,996
[45] Aug. 8, 1978

[54] DISCONNECTION INDICATING APPARATUS FOR AUTOMOBILES

[75] Inventor: Akio Shimizu, Tone, Japan

[73] Assignee: Niles Parts Co., Ltd., Tokyo, Japan

[21] Appl. No.: 760,717

[22] Filed: Jan. 19, 1977

[30] Foreign Application Priority Data

Aug. 3, 1976 [JP] Japan .................................. 51/27261

[51] Int. Cl.² .............................................. G08B 21/00
[52] U.S. Cl. .................................. 340/73; 340/81 R;
340/642
[58] Field of Search ............... 340/73, 81 R, 80, 81 F,
340/251; 315/82, 83; 11/11

[56] References Cited

U.S. PATENT DOCUMENTS

| 3,421,107 | 1/1969 | Keller ................................ 340/81 R |
| 3,801,975 | 4/1974 | Kitano ................................ 340/251 |
| 3,858,177 | 12/1974 | Kuselmann et al. .................... 340/73 |
| 3,987,424 | 10/1976 | Brouwer et al. ....................... 340/80 |

Primary Examiner—John W. Caldwell, Sr.
Assistant Examiner—Donnie L. Crosland
Attorney, Agent, or Firm—Lane, Aitken, Dunner & Ziems

[57] ABSTRACT

A disconnection indicating apparatus for automobiles which electrically detects a disconnection or failure of an automobile turn signal and automatically signals the failure by flashing the disconnected turn signal lamps at an increased flash frequency.

1 Claim, 6 Drawing Figures 4,105,996

DISCONNECTION INDICATING APPARATUS FOR AUTOMOBILES

BACKGROUND OF THE INVENTION

The present invention relates to an apparatus for flashing the turn signal lamps and display lamps of an automobile at an increased frequency when at least one of the turn signal lamps is disconnected. Thus, nearby automobiles are warned of the signal lamp malfunction and a potentially dangerous traffic situation is averted.

FIG. 1 illustrates a conventional apparatus for detecting a disconnection of a turn signal lamp which includes a flashing unit 25, a direction indicating switch 7, a display lamp 26, and a direct current power source 10. In normal operation, a current relay 8 provides discontinuous signal pulses to intermittently operate the signal lamps 2 and 3 or 5 and 6, respectively. However, when a signal lamp is disconnected, the relay 8 sends a continuous signal to the lamps and the lamps are thereby continuously operated to passively indicate the lamp failure condition.

The prior art has had difficulty in providing a simple circuit for utilizing the above continuous and discontinuous relay output signals to intermittently activate the signal lamps at an increased flash frequency to signal a disconnect condition. Indeed, even if the above discontinuous signal is integrated to produce the desired result, the output of an integrated constant level control signal is delayed.

Accordingly, it is an object of the invention to provide an apparatus for signaling a direction indicating lamp failure in a particular vehicle to the driver of the vehicle and other drivers in the near vicinity of the vehicle.

It is another object of the invention to provide an apparatus for signaling the disconnection of a direction indicating lamp by increasing the flash frequency of the lamp.

It is a further object of the invention to provide a simple, inexpensive and reliable disconnection indicating apparatus that is easy to manufacture.

These and other objects of the invention will become apparent from a review of the detailed specification which follows and a consideration of the accompanying drawings.

SUMMARY OF THE INVENTION

The disconnection indicating apparatus according to the invention for use as a turn signal condition indicator includes a turn signal selecting means for activating a plurality of turn signal lamps. A pulse generation means are provided for generating a continuous stream of electrical pulses at a predetermined selected frequency. A switch detection means is in circuit with the turn signal selecting switch and the pulse generating means to detect the operation of the selecting switch and thereafter activate the pulse generating means.

An intermittent switching means is connected to a source of power and adapted to receive the pulses from the pulse generating means to intermittently switch the source of power at the pulse frequency. In this way, the selected turn signal lamps are intermittently energized. A memory means is adapted to switch between a plurality of stable operational states to select a particular frequency signal for the pulse generator. The operational state of the memory means is selected by a current detection means arranged to monitor the flow of current to the selected lamps and in response to changes in current flow.

DETAILED DESCRIPTION OF THE PREFERRED EMBODIMENTS

Figure 2:
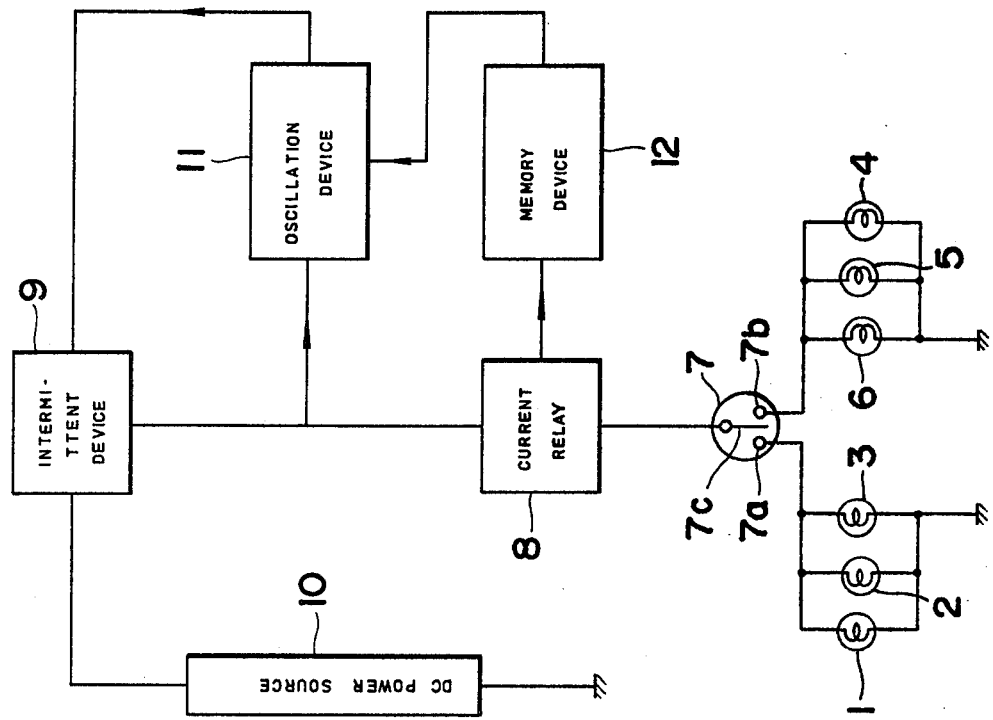
FIG. 2 is a basic block diagram of the apparatus of the present invention.
Figure 1:
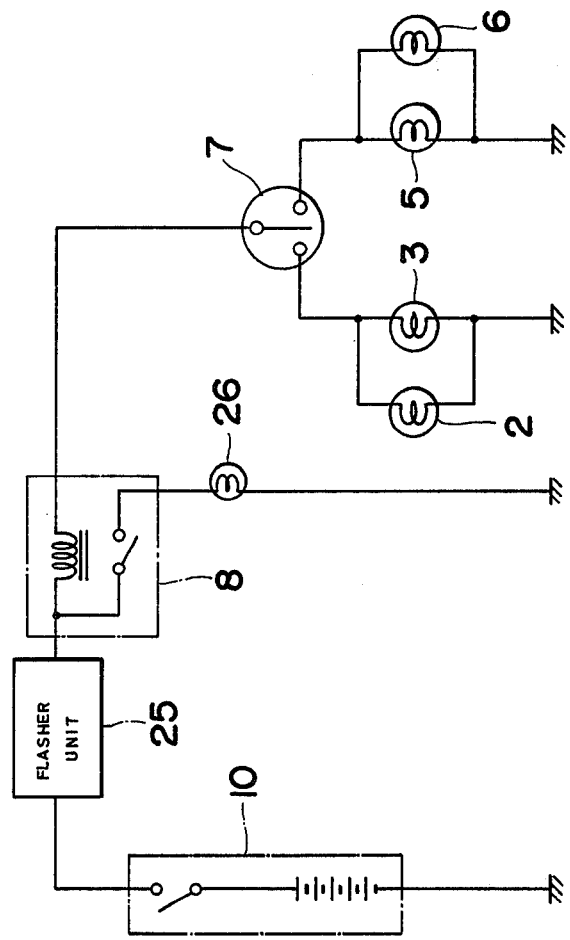
FIG. 1 is a schematic block diagram of a conventional apparatus for detecting the disconnection of direction indicating lamps.

FIG. 2 illustrates an embodiment of the present invention in which a switch 7 is used to operate either left direction indicating lamps 1–3 or right direction indicating lamps 4–6. In addition, the embodiment includes a current relay 8 which detects a disconnection of either the left or right direction indicating lamps, an intermittent device 9, such as a flasher, a D.C. electrical power source 10 for flashing the direction indicating lamps and an oscillation device 11 with a first input terminal that is connected to the current relay 8 and the intermittent device 9. The output terminal of the oscillation device 11 is connected to an input terminal of the intermittent device 9, thereby introducing a signal for operating the intermittent device 9 when the switch 7 selects either the left or right direction lamps. Further, the embodiment includes a memory device 12 with an input terminal connected to the current relay 8 and an output terminal connected to a second input terminal of the oscillation device 11. The memory device 12 converts an intermittent output signal of the current relay 8 into a continuous frequency select signal that selects an appropriate output frequency from the oscillation device 11.

Figure 3:
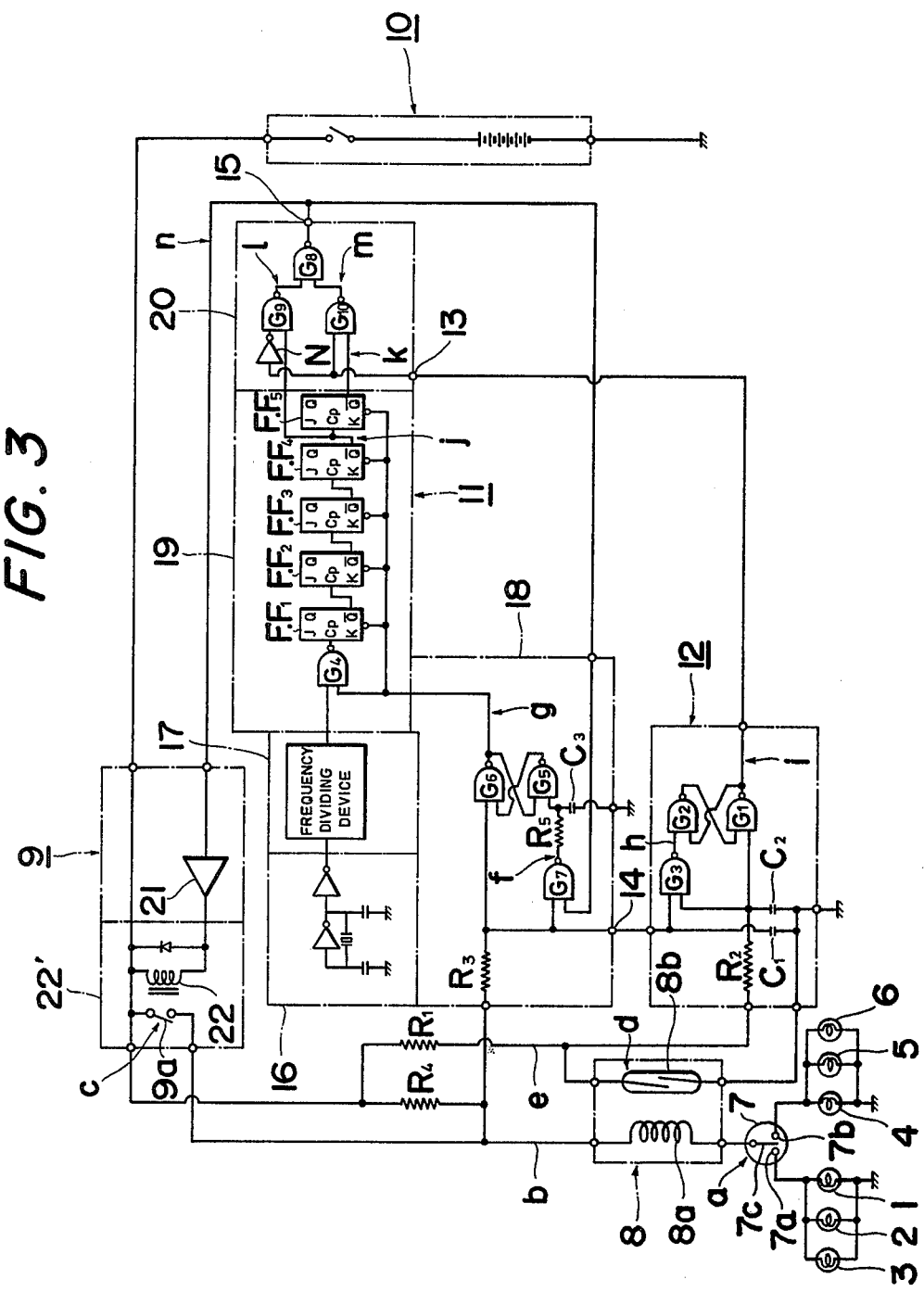
FIG. 3 is a circuit diagram of a first preferred embodiment of the invention.
Figure 4:
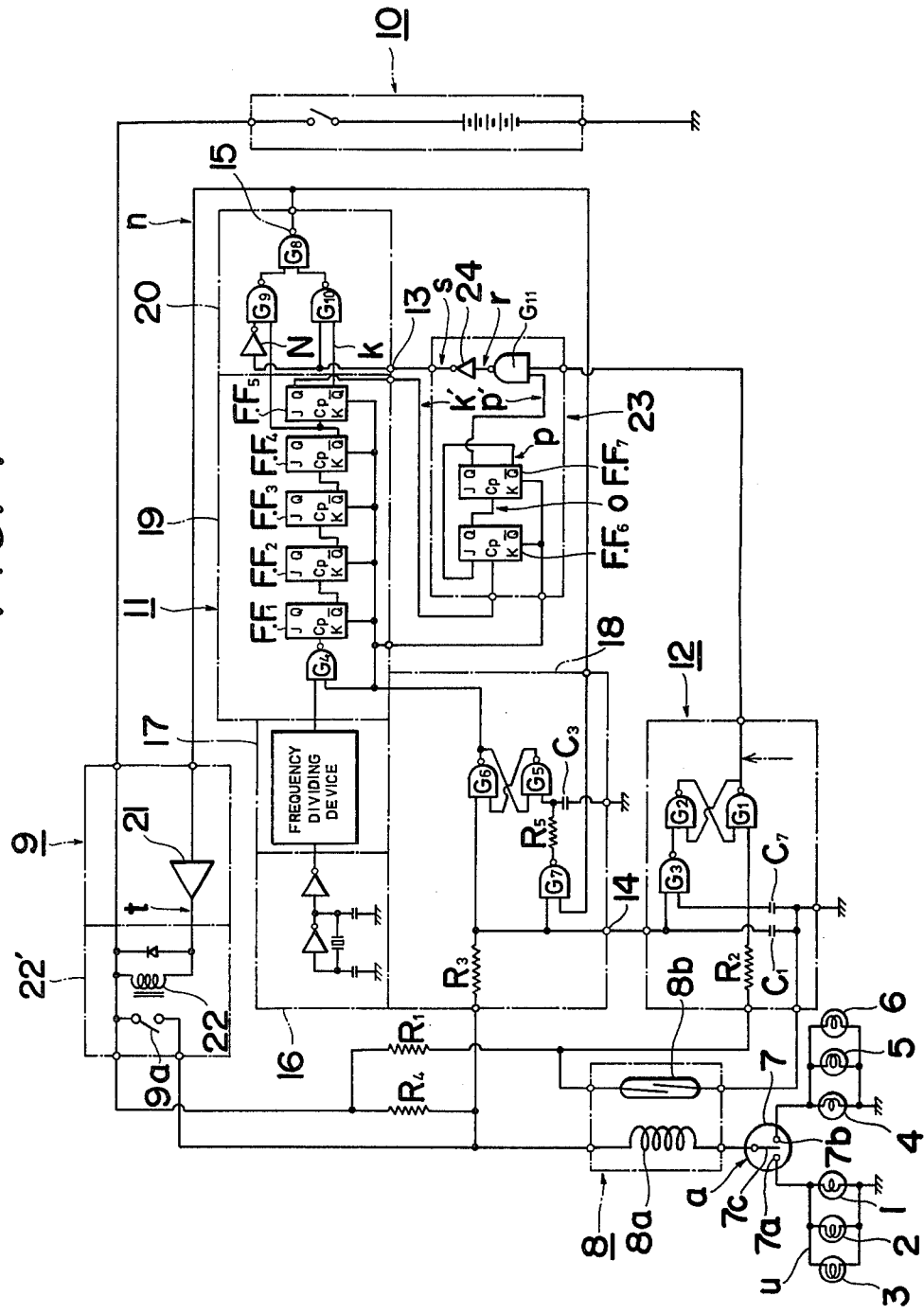
FIG. 4 is a circuit diagram of a second preferred embodiment of the invention.
Figure 6:
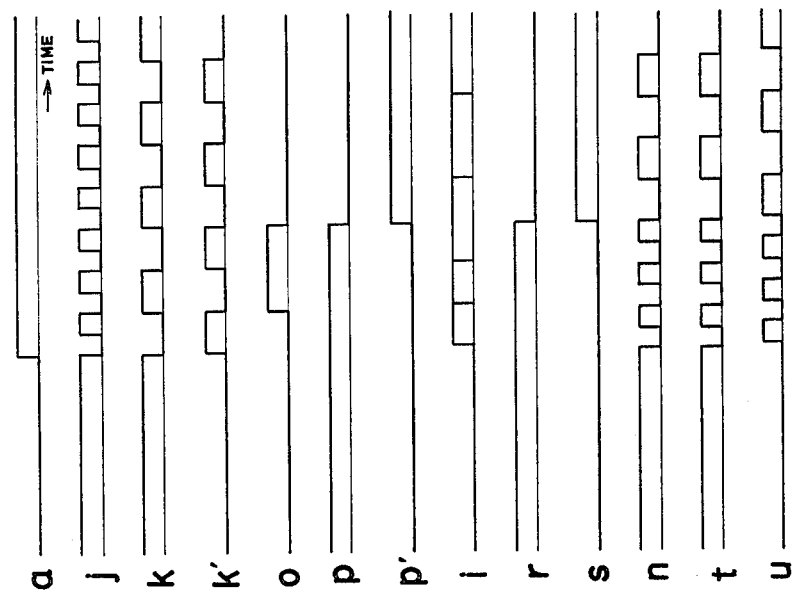
FIG. 6 is a timing flow chart for the second preferred embodiment of FIG. 4 in which $a$ represents a waveform for the operation of a direction indicating switch 7, $u$ a waveform for the operation of the direction indicating lamps and display lamps, and $j, k, k', o, p, p', i, r, s, n$ and $t$ are timing charts for the voltage at points $j, k, k', o, p, p' i, r, s, n$ and $t$ of FIG. 4 respectively.
Figure 5:
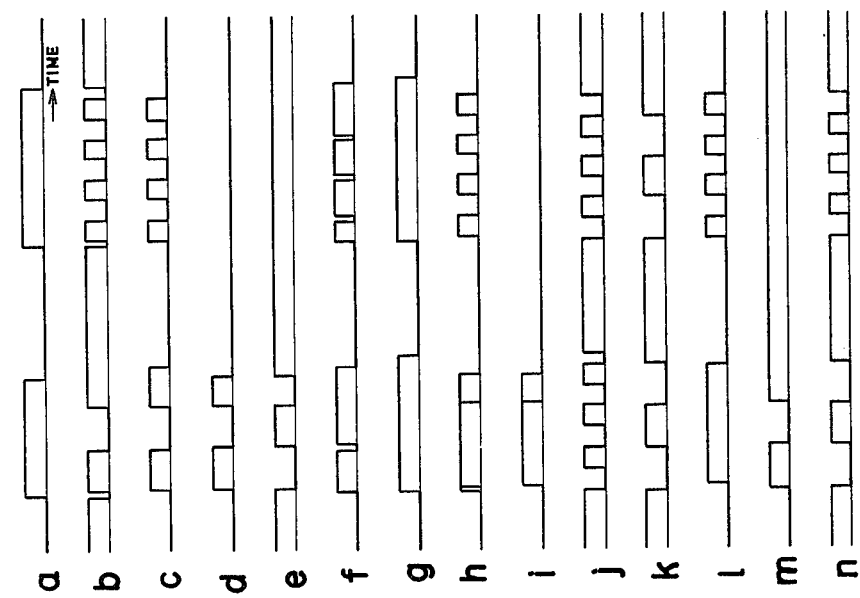
FIG. 5 is a timing diagram for the first preferred embodiment of FIG. 3 in which $a$ represents a waveform for the operation of a direction indicating switch 7, $c$ a waveform for the operation of a switch 9$a$, $d$ a waveform for the operation of a reed switch 8$b$, and $b$ and $e$ to $n$ are timing diagrams for the voltage at points $b$ and $e$ to $n$ in FIG. 3 respectively.

FIGS. 3 and 4 show specific circuit embodiments of the invention that relate to the basic configuration that is illustrated in FIG. 2.

Referring first to the embodiment of the invention shown in FIG. 3, reference numeral 1 designated a pilot lamp and reference numerals 2 and 3 designate left direction indicating lamps. A terminal of each of the lamps is grounded and the remaining terminals are connected to a fixed contact 7$a$ of a direction indicating switch 7. Similarly, reference numerals 5 and 6 designate right direction indicating lamps and reference numeral 4 designates a right display lamp. Likewise, a terminal of each of the right turn lamps is grounded and the other lamp terminals are connected to a fixed contact 7$b$ of the direction indicating switch 7. A movable contact 7c of the switch 7 is connected to one terminal of the DC power source 10 through a coil 8a of the current relay 8 and a switch 9a of the intermittent device 9. The other terminal of the DC power source 10 is grounded. Number 8b designates a reed switch which has one terminal grounded and the other terminal connected to the DC power source 10 through a resistor R. The reed switch 8b is activated when a sufficient current is passed through coil 8a. Numeral 12 designates a flip flop memory device which includes gates $G_1$, $G_2$ and $G_3$.

More particularly, an input of the NAND gate $G_1$ of the memory device 12 is connected to an input of the NAND gate $G_3$ and to a terminal of the reed switch 8b through a resistor $R_2$. The other input of the NAND gate $G_1$ is connected to an output of the NAND gate $G_2$, and one input of the gate $G_2$ is connected to an output of the gate $G_3$. The other input of the gate $G_2$ is cross-connected to an output of the gate $G_1$ and to a second frequency select input of the oscillation device 11. A second input of the gate $G_3$ is connected to a first input 14 of the oscillator device 11 and to a connection point between the coil 8a and a switch 9a through a resistor $R_3$. The connection point connects with the power source 10 through a resistor $R_4$. The inputs of the gate $G_3$ are grounded through capacitors $C_1$ and $C_2$ to limit the effect of noise.

The memory device 12 is used to convert a pulse output signal of the current relay 8 into a logic level signal that is used to control the output frequency of the oscillation device 11.

With reference to the oscillation device 11, reference numeral 16 designates a reference frequency generator, such as a crystal or tuning fork clock, that provides a series of electric pulses. In the following discussion, it is assumed that a crystal clock will be used to generate the electric pulses.

The high frequency signal of the crystal clock is initially lowered to a suitable frequency range by means of a frequency dividing device 17. The lower frequency output of the device 17 is introduced into one input of a NAND gate $G_4$.

Reference numeral 18 designates a circuit for detecting the switching operation of the direction indicating switch 7. The detection circuit comprises NAND gates $G_5$, $G_6$, $G_7$; resistors $R_3$, $R_4$; and capacitor $C_3$. Cross connected gates $G_5$ and $G_6$ form a flip flop circuit with an output g that is connected to the input of the gate $G_4$. A set terminal of the flip flop circuit is connected to the first input terminal 14 and a reset terminal is grounded through the capacitor $C_3$ and connected to an output of the NAND gate $G_7$ through a resistor $R_5$.

One input of the gate $G_7$ is connected to the first input terminal 14 of the oscillation device 11 and the other input is connected to an output terminal 15 of the oscillation device 11. The detector 18 produces a signal that enables the gate $G_4$ when the closed state of the direction indication switch 7 is detected.

Numeral 19 designates a frequency dividing device for dividing the output signals from the crystal clock 16 and frequency dividing device 17 into a pulse signal for flashing the direction indicating lamps 1 to 6. For instance, if the output frequency of the gate $G_4$ is 32 times as large as a signal that is suitable for flashing the lamps, the desired frequency can be obtained by using five J.K flip flops, $F.F_1$ to $F.F_5$, connected in series.

Numeral 20 designates a frequency switching device that responds to the output of the memory device 18 to select a particular output pulse frequency from the frequency dividing device 19 of the oscillation device 11.

The frequency selection device 20 comprises NAND gates $G_8$, $G_9$, $G_{10}$ and an inverter N. The inputs of the gate $G_8$ are connected to the outputs of the gates $G_9$ and $G_{10}$ respectively, and the output of the gate $G_8$ is connected to the output terminal 15 of the oscillation device 11. In addition, an input of the gate $G_9$ is connected to the output of a J.K. flip flop circuit $F.F_4$ and the other input of the gate $G_9$ is connected to a second input terminal 13 of the oscillation device 11 through the inverter N. Further, an input of the gate $G_{10}$ is connected to an output of a J.K flip flop $F.F_5$, and the other input of the gate $G_{10}$ is connected to the second input terminal 13 of the oscillation device 11.

In the frequency selection device 20, the gates $G_9$ and $G_{10}$ are respectively enabled by a low or high signal level from the memory device 12, thereby passing to the output terminal 15 either the high frequency signal that is associated with flip flop $F.F_4$ or the low frequency signal of $F.F_5$.

The intermittent device 9 operates a switch 9a in accordance with the output signal of the oscillation device 11. More particularly, the output 15 of the oscillation device 11 is connected to an input of an amplifier 21. A relay coil 22 is inserted between the output of the amplifier 21 and the power source 10, and the associated relay is adapted to open switch 9a when the relay coil 22 is energized. It is unnecessary to use the amplifier 21 if the output voltage of the oscillation device 11 is sufficient to energize the relay coil 22.

Referring now to the operation of the above-mentioned circuits, when the direction indicating switch 7 is off, the lamps 1-6 are not energized, the potential at the first input terminal 14 of the oscillation device 11 is a high level H, and the potential at the output of the gate $G_6$ is a low level L. Thus, the gate $G_4$ does not pass the output of the frequency dividing device 17 and the oscillation device 11 does not produce a continuous signal at output terminal 15. In addition, the relay coil 22 of the intermittent device 9 remains energized, thereby holding switch 9a in the open position.

When the direction indicating switch 7 is actuated and the movable contact 7c engages a fixed contact, for example 7a, the switch 9a of the intermittent device 9 is still open and the first input terminal 14 of the oscillation device 11 is grounded through a resistor $R_3$, coil 8a, switch 7, and left direction indicating lamps 1 to 3. Thus, the operation of switch 7 immediately results in a low signal at terminal 14.

The low signal at terminal 14 forces the output of gate $G_6$ to a high level H, thereby enabling gate $G_4$ to pass the output signal of the frequency dividing device 17 to the frequency dividing device 19. The device 19 further lowers the frequency of the output pulse signal and a particular lowered pulse signal is selected by device 20 to produce a continuous output pulse of a specified frequency at terminal 15. The continuous output signal intermittently operates switch 9a and the intermittent operation of switch 9a operates the left direction indicating lamps 1 to 3 for left-turn signaling.

Although the potential at terminal 14 goes high when switch 9a is closed, the continuous signal at terminal 15 is uneffected since the corresponding low at terminal 15 forces a high at the output of $G_7$, a high at the output of $G_6$, and, therefore, a continued enabling of $G_4$ to pass the clock signal to the frequency divider 19.

Thus, the left direction indicating lamps 1 to 3 continue to flash despite the intermittent operation of switch 9a and the corresponding logic level change at terminal 14. It is noted that during the normal flashing of all of the left direction indicating lamps 1 to 3, a reed switch 8b of a current relay 8 is opened and closed in response to the opening and closing of the switch 9a.

Following the activation of switch 7, and during the above normal operation of the direction indicating lamps, the memory device 12 generates a continuous logic high output signal that enables the gate $G_{10}$ of the frequency select device 20, thereby selecting the "normal" frequency output signal from the J.K flip flop $F.F_5$. As explained above, this normal frequency output signal appears at terminal 15, intermittently activates switch 9a, and operates a selected set of direction lamps, for example lamps 1-3, at a predetermined normal flash frequency.

The high normal frequency select signal at the output of gate $G_1$ is initially generated when switch 7 is closed, the potential of the indicating lamps is low, the common input to gates $G_3$ and $G_1$ is low, and the single input to $G_3$ is low. The low input signals at $G_3$ and $G_1$ cause the cross-connected gates $G_1$ and $G_2$ to "latch" with the output of $G_1$ high.

Following the activation of switch 7, switch 9a is closed as described above, a group of direction indicating lamps is energized, for example lamps 1-3, the reed switch 8b is closed, and the common input to $G_1$ and $G_3$ is forced low due to the grounding of the input through the closed reed switch. Thus, the output of the gate $G_1$ is maintained at a high logic level during normal flashing operation without regard to the potential at the non-common input of $G_1$, the operation of the switch 9a, or the operation of the reed switch 8b.

When a selected direction indicating lamp is disconnected during normal flashing operation, the remaining lamps still continue to flash. However, the current that flows into the coil 8a is decreased due to the disconnection of the lamp and the magnetomotive force of the coil 8a is thereby reduced to a level that is insufficient to close the reed switch 8b. Thus, the reed switch remains open when switch 9a is closed and the potential at the common input to gates $G_3$ and $G_1$ remains high. Since, as explained above, the potential at the terminal 14 is high when the switch 9a is closed, both inputs to gate $G_3$ are high, the output of $G_3$ is forced low, and the cross-connected gates $G_1$ and $G_2$ are "latched" with the output of $G_1$ low.

The low signal at the output of $G_1$ disables gate $G_{10}$, and enables gate $G_9$ of the frequency select device 20. The enabled gate $G_9$ passes the high frequency pulse signals from the J.K flip flop $F.F_4$ to the output terminal 15 and the intermittent device 9 operates the selected direction indicating lamps at the increased frequency. Thus, a disconnection of a direction indicating lamp is signaled by an increase in the flashing frequency of the remaining selected lamps.

A second embodiment of the invention is shown in FIG. 4. This embodiment provides an initial flash frequency switching device 23 for increasing the initial flash frequency of the direction indicating lamps to improve the monitoring of the signaling operations. The flash frequency device 23 is comprised of two J.K flip flops $F.F_6$ and $F.F_7$, a NAND gate $G_{11}$ and an inverter 24. An input CDP of the flip flop $F.F_6$ is connected to an output Q of the flip flop $F.F_5$ in the frequency dividing device 19. An output Q of $F.F_6$ is connected to an input CP of the flip flop $F.F_7$, and output Q of the flip flop $F.F_7$ is connected to an input J of the flip flop $F.F_6$. A Q output of the flip flop $F.F_7$ is connected to an input of the gate $G_{11}$ and the reset signal inputs for the flip flops $F.F_6$ and $F.F_7$ are connected to the output of the gate $G_6$. In addition, the output of the gate $G_1$ in the memory device 12 is connected to an input of the gate $G_{11}$ and the output of $G_{11}$ is connected through the inverter 24 to a second input 13 of the oscillation device 11. It is noted that a single AND gate could be substituted for the NAND gate $G_{11}$ and the inverter 24.

When the direction indicating switch 7 is initially operated, the J.K flip flops $F.F_6$ and $F.F_7$ of the above-described flash frequency circuit, begin counting the normal frequency output signals that are generated at terminal 15 by the frequency dividing circuit 19. When three pulses have been counted, the counting operation of the J.K flip flop $F.F_6$ is stopped by a signal from the output Q of the J.K flip flop $F.F_7$. During the counting operation, a low output signal is generated at the Q output of the flip flop $F.F_7$. The low signal forces the output of the inverter 24 low and thereby enables gate $G_9$ to pass increased frequency signals from flip flop $F.F_4$ to the terminal 15.

At the end of the three-pulse counting interval the Q output of flip flop $F.F_7$ returns to a high logic level and, if the output of gate $G_1$ is high, gate $G_9$ is disabled, $G_{10}$ is enabled, and the pulse frequency at terminal 15 returns to normal. Thus, the direction indicating lamps are operated at an increased frequency for an initial three flashes, and then the flash operation is returned to its normal frequency. In normal operation, the frequency selection device 20 is controlled by the output signal at the gate $G_1$ of the memory device 12.

Thus, the apparatus of the second embodiment momentarily increases the flash frequency of the direction indicating lamps when signaling is initiated to immediately indicate the start of a signaling operation to drivers in following vehicles.

The above-described logic circuitry provides a simple and effective means to detect a disconnection of a signaling lamp, to indicate the disconnect condition by means of a simple high or low logic signal, and to automatically indicate the condition to an operator and following drivers by means of a simple circuit that automatically and without appreciable time delay increases the flash frequency of the remaining operating lamps. In addition, the above circuitry provides for a simple means to momentarily increase the flash frequency of the turn signal lamps when a turn signal is initiated in order to warn the drivers of following vehicles of an impending turn.

Furthermore, by utilizing a crystal clock to generate a reference frequency, adjustments in the flash frequency and in the ratio of flashing become simple and easy. Moreover, since a separately-excited crystal clock oscillator is used, the flash frequency and the ratio of flashing are not particularly affected by changes in ambient temperature or supply voltage and, therefore, the reliability of the circuit is enhanced and total circuit cost is reduced.

The invention may be embodied in other specific forms without departing for its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

I claim:

1. A disconnection indicating apparatus for use as an initial activating and turn signal lamp out indicator for automobiles, said apparatus comprising;

turn signal selecting switch for activating a plurality of selected turn signal lamps;

pulse generation means for generating a continuous stream of electrical pulses at a specified selected frequency;

switch detection means for detecting the operation of said turn signal select switch and thereafter activating said pulse generation means;

intermittent switching means connected to a source of power and adapted to receive said pulses to intermittently switch said power at the frequency of said pulses to intermittently energize said selected turn signal lamps;

current detection means adapted to monitor the flow of current to said selected lamps and to generate a specified frequency selecting signal in response to changes in said current flow; and initial flash frequency switching means adapted to select an initial frequency pulse signal from said pulse generation means for a specified period of time following the initial activation of said turn signal select switch and to thereafter respond to said frequency selecting signal from said current detection means to switch between a plurality of stable operational states to select a particular frequency pulse signal from said pulse generation means.

* * * * *